(12) United States Patent
Tesser et al.

(10) Patent No.: US 11,093,944 B1
(45) Date of Patent: Aug. 17, 2021

(54) SYSTEMS AND METHODS FOR PEER-TO-PEER IDENTITY VERIFICATION

(71) Applicant: Capital One Services, LLC, McLean, VA (US)

(72) Inventors: Daniel Tesser, McLean, VA (US); Jeffrey Carlyle Wieker, McLean, VA (US); Luis de la Rosa, McLean, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

(21) Appl. No.: 16/864,028

(22) Filed: Apr. 30, 2020

(51) Int. Cl.
*G06Q 20/40* (2012.01)
*H04W 4/80* (2018.01)
*G06Q 20/34* (2012.01)

(52) U.S. Cl.
CPC ..... *G06Q 20/40145* (2013.01); *G06Q 20/352* (2013.01); *H04W 4/80* (2018.02)

(58) Field of Classification Search
CPC .............................................. G06Q 20/40145
USPC .......................................................... 705/44
See application file for complete search history.

(56) References Cited

U.S. PATENT DOCUMENTS

| | | | |
|---|---|---|---|
| 9,086,689 B2 | 7/2015 | Narendra et al. | |
| 9,143,938 B2 | 9/2015 | Narendra et al. | |
| 9,154,500 B2 | 10/2015 | Narendra et al. | |
| 9,183,371 B2 | 11/2015 | Narendra et al. | |
| 9,207,650 B2 | 12/2015 | Narendra et al. | |
| 9,215,592 B2 | 12/2015 | Narendra et al. | |
| 9,231,945 B2 | 1/2016 | Narendra et al. | |
| 9,319,881 B2 | 4/2016 | Narendra et al. | |
| 9,436,165 B2 | 9/2016 | Narendra et al. | |
| 9,448,543 B2 | 9/2016 | Narendra et al. | |
| 9,781,598 B2 | 10/2017 | Narendra et al. | |
| 2013/0244615 A1 | 9/2013 | Miller | |
| 2013/0276140 A1* | 10/2013 | Coffing | H04L 63/104 726/27 |
| 2014/0266602 A1 | 9/2014 | Narendra et al. | |
| 2014/0266603 A1 | 9/2014 | Narendra et al. | |
| 2014/0266606 A1 | 9/2014 | Narendra et al. | |

(Continued)

FOREIGN PATENT DOCUMENTS

| | | |
|---|---|---|
| EP | 2608480 A2 | 6/2013 |
| EP | 2594056 B1 | 4/2019 |

(Continued)

*Primary Examiner* — Cho Kwong
(74) *Attorney, Agent, or Firm* — Hunton Andrews Kurth LLP

(57) ABSTRACT

An identity verification system may include a contactless card comprising a processor and a memory, and one or more applications comprising instructions for execution on one or more devices. The contactless card may be associated with a first user. A first application may be configured to transmit, after entry of the contactless card into a communication field, identity data. A second application may be configured to receive a notification based on an identity verification process. The notification may comprise an option indicative of requested access to specified information about the first user, the option further including a choice to accept or decline access to the specified information about the first user. The first application may be configured to receive the requested access to specified information about the first user based on selection of the option.

20 Claims, 6 Drawing Sheets

(56) References Cited

U.S. PATENT DOCUMENTS

2014/0270174 A1   9/2014   Narendra et al.
2014/0270175 A1   9/2014   Narendra et al.
2014/0273959 A1   9/2014   Narendra et al.
2014/0273960 A1   9/2014   Narendra et al.
2016/0127859 A1   5/2016   Brands

FOREIGN PATENT DOCUMENTS

WO   2010129188 A2   11/2010
WO   2014026616 A1   2/2014
WO   2014085704 A1   6/2014

* cited by examiner

US 11,093,944 B1

SYSTEMS AND METHODS FOR PEER-TO-PEER IDENTITY VERIFICATION

FIELD OF THE DISCLOSURE

The present disclosure relates to systems and methods for peer-to-peer identity verification.

BACKGROUND

In peer-to-peer interactions, there is often a disconnect between verification of user identities, as there is no source verifying the claims made about an individual identity in a secure manner. There are also limitations in permission handling and application integration. For example, applications may apply different standards to identity claims or seek different information for purposes of verification. This may cause one application to verify a user where another application would not, which may result in different levels of security. Additional input of verification factors or other actions may be required to reach an adequate level of security. As another example, applications may be based on various platforms that may not be fully compatible, which may reduce cross-application communication and functionality and decrease efficiency.

These and other deficiencies exist. Accordingly, there is a need for systems and methods for peer-to-peer identity verification that provide enhanced security and an improved user experience in controlled permission handling and application integration without requiring additional factor input.

SUMMARY OF THE DISCLOSURE

Embodiments of the present disclosure provide an identity verification system, including a contactless card comprising a processor and a memory. The system may comprise one or more applications comprising instructions for execution on one or more devices. A first application may be configured to transmit, after entry of the contactless card into a communication field, identity data. The first application may comprise instructions for execution on a first client device. A second application may be configured to receive a notification based on an identity verification process. The second application may comprise instructions for execution on a second client device. The notification may include an option indicative of requested access to specified information about the first user. The option may further include a choice to accept or decline access to the specified information about the first user. The first application may be configured to receive the requested access to specified information about the first user based on selection of the option. The application may be configured to determine a capability associated with the contactless card after a first entry into a communication field. The application may be configured to request additional information based on the determination. The one or more applets may be configured to transmit, to the application, a generated tokenized link after a second entry into the communication field based on the requested additional information. The application may be configured to transmit the link to obtain the requested additional information.

Embodiments of the present disclosure provide a method of identity verification. The method may include transmitting, after entry of a contactless card into a communication field, identity data by a first application comprising instructions for execution on a first client device. The method may include receiving, based on an identity verification process of the identity data, a notification at a second application comprising instructions for execution on a second client device, the notification comprising an option indicative of requested access to specified information about a first user, the option further including accept or decline access to the specified information about the first user. The method may include receiving, based on selection of the option, the requested access to specified information about the first user.

Embodiments of the present disclosure provide a computer readable non-transitory medium comprising computer-executable instructions that are executed on a processor and comprising the steps of transmitting, via at least one selected from the group of a near field communication (NFC) scan and image capture of a contactless card, identity data for identity verification by a first application; performing an identity verification process on the transmitted identity data; determining an outcome based on the identity verification process; transmitting the notification to a second application based on the outcome; customizing at least one selected from the group of specified information about a first user and access to the specified information about the first user; receiving, based on the identity verification process of the identity data, a notification, the notification comprising an option associated with requested access to specified information about the first user; and receiving, based on selection of the option, the requested access to specified information about the first user, wherein the notification further comprises a message that the first application comprising instructions for execution on a first client device is in communication with a contactless card and is requesting access to specified information about the first user, and the second application comprises instructions for execution on a second client device different than the first client device.

BRIEF DESCRIPTION OF THE DRAWINGS

Various embodiments of the present disclosure, together with further objects and advantages, may best be understood by reference to the following description taken in conjunction with the accompanying drawings, in which.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

By utilizing NFC mobile and transmitting device capabilities, two individuals may be enabled to identify each other via the systems and methods disclosed herein. A user card may be scanned by a device, in which another device is notified. This notification provides the option to accept or decline access to user identity. Upon acceptance, a user may receive relevant contact information about the other user. Regardless of the type of device, no additional input is needed. This represents an improvement over existing implementations by providing greater and more consistent security with controlled permission handling and application integration without requiring additional factor input for identity verification. In addition to increased security, the user experience is improved and identifications can be performed more efficiently and effectively. Further, identity can be confirmed with only a minimal amount of data revealed (i.e., handing a card to another person) and this can be additionally reduced by the card user maintaining control of their card and tapping their card themselves on the other user's device.

Figure 1:
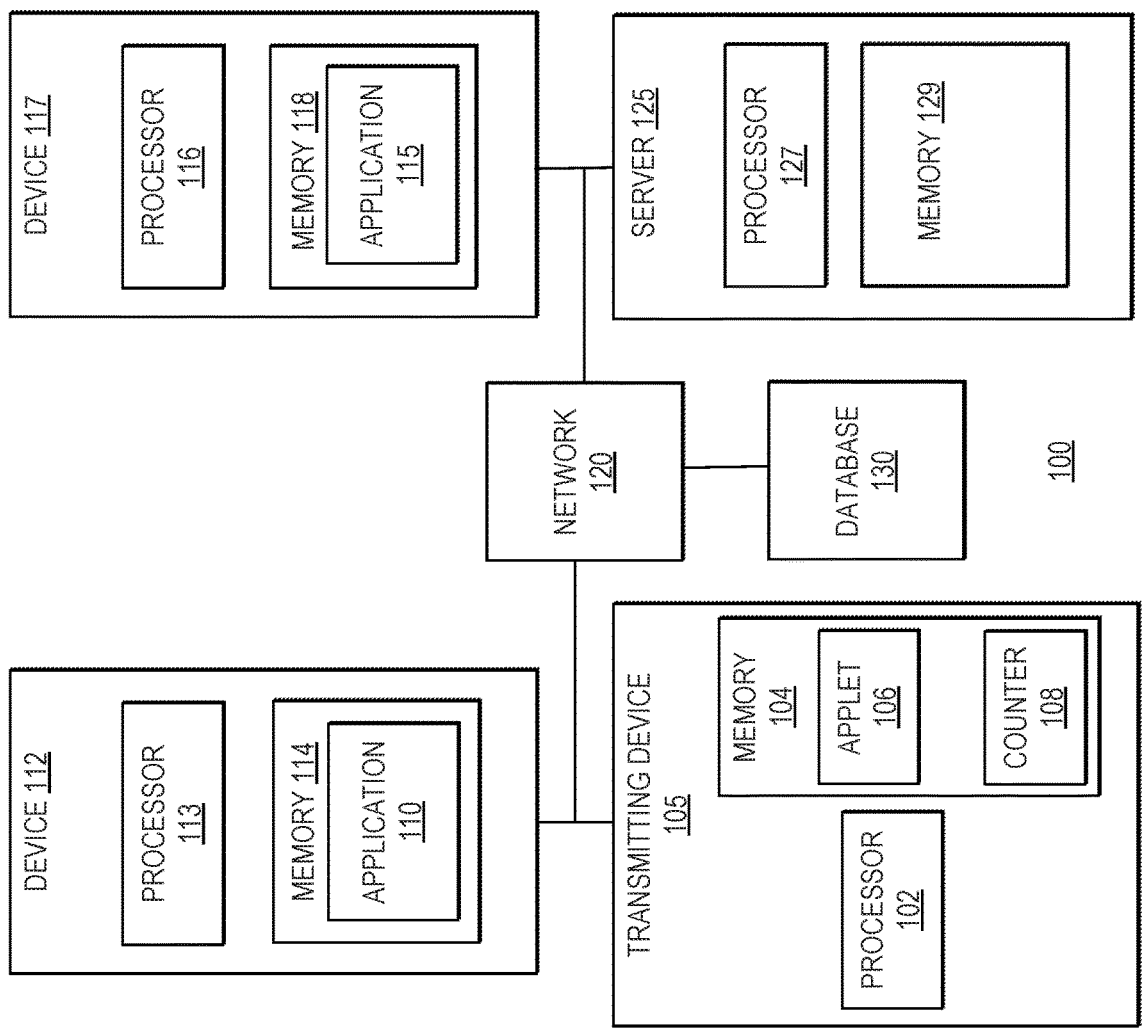
FIG. 1 depicts an identity verification system according to an exemplary embodiment.

FIG. 1 illustrates an identity verification system 100 according to an exemplary embodiment. The identity verification system 100 may comprise a transmitting device 105, a first application 110, a second application 115, a network 120, a server 125, and a database 130. Although FIG. 1 illustrates single instances of components of system 100, system 100 may include any number of components.

System 100 may include a transmitting device 105. The transmitting device 105 may comprise a contactless card or other device described herein. As further explained below in FIGS. 2A-2B, transmitting device 105 may include one or more processors 102, and memory 104. Memory 104 may include one or more applets 106 and one or more counters 108. Transmitting device 105 may be in data communication with one or more devices 112, 117. For example, transmitting device may transmit data via network 120 to client devices 112, 117. In some examples, transmitting device 105 may be configured to transmit data via network 120 to client device 117 after entry into one or more communication fields of client devices 112, 117. In some examples, the transmitting device 105 may be configured to transmit data after one or more entries into one or more communication fields of respective client devices 112, 117, each entry associated with a gesture, including but not limited to a tap, a swipe, a wave, and/or any combination thereof.

System 100 may include a first application 110. For example, first application 110 may comprise instructions for execution on a first device 112. First application 110 may be in communication with any components of system 100. For example, first device 112 may execute one or more applications, such as first application 110, that enable, for example, network and/or data communications with one or more components of system 100 and transmit and/or receive data. The first device 112 may include one or more processors 113 coupled to memory 114. For example, first device 112 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. First device 112 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first device 112 may include processing circuitry and may contain additional components, including processors, memories, error and parity/CRC checkers, data encoders, anticollision algorithms, controllers, command decoders, security primitives and tamperproofing hardware, as necessary to perform the functions described herein. The first device 112 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. In some examples, the first device 112 may include at least one selected from the group of a mobile device, a wearable device, a point of sales system, a kiosk, and a terminal.

System 100 may include a second application 115. Second application 115 may comprise instructions for execution on a second device 117. Second application 115 may be in communication with any components of system 100. For example, second device 117 may execute one or more applications, such as second application 115, that enable, for example, network and/or data communications with one or more components of system 100 and transmit and/or receive data. The second device 117 may include one or more processors 116 coupled to memory 118. For example, second device 117 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Second device 117 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 117 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 117 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. In some examples, the second device 117 may include at least one selected from the group of a mobile device, a wearable device, and a kiosk.

System 100 may include a network 120. In some examples, network 120 may be one or more of a wireless network, a wired network or any combination of wireless network and wired network, and may be configured to connect to any one of components of system 100. For example, client devices 112, 117 may be configured to connect to server 125 via network 120. In some examples, network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 may include, without limitation, telephone lines, fiber optics, IEEE Ethernet 902.3, a wide area network, a wireless personal area network, a LAN, or a global network such as the Internet. In addition, network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

Client devices 112, 117 may be in communication with one or more servers 125 via one or more networks 120, and may operate as a respective front-end to back-end pair with server 125. Client devices 112, 117 may transmit, for example from a mobile device application 110, 115 executing thereon, one or more requests to server 125. The one or more requests may be associated with retrieving data from server 125. Server 125 may receive the one or more requests from client devices 112, 117. Based on the one or more requests from client applications 110, 115, server 125 may be configured to retrieve the requested data. Server 125 may be configured to transmit the received data to client applications 110, 115, the received data being responsive to one or more requests.

System 100 may include one or more servers 125. In some examples, server 125 may include one or more processors 127 coupled to memory 129. Server 125 may be configured as a central system, server or platform to control and call various data at different times to execute a plurality of workflow actions. Server 125 may be configured to connect to one or client devices 112, 117. Server 125 may be in data communication with the client applications 110, 115. For example, a server 125 may be in data communication with the client applications 110, 115 via one or more networks 120.

System 100 may include one or more databases 130. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the devices 112, 117 or the database 130 may be hosted externally to the devices 112, 117, such as by a server 125, by a cloud-based platform, or in any storage device that is in data communication with the devices 112, 117. In some examples, database 130 may be in data communication with any number of components of system 100. For example, server 125 may be configured to retrieve the requested data from the database 130 that is transmitted by applications 110, 115. Server 125 may be configured to transmit the received data from database 130 to client applications 110, 115 via network 120, the received data being responsive to the transmitted one or more requests. In other examples, client applications 110, 115 may be configured to transmit one or more requests for the requested data from database 130 via network 120.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client devices 112, 117 and/or server 125 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The first application 110 may be configured to transmit, after entry of the contactless card 105 into a communication field of device 112, identity data. The entry may occur via one or more gestures, including but not limited to a tap, a swipe, a wave, and/or any combination thereof. As previously explained, the first application 110 may comprise instructions for execution on a first client device 112. In some examples, the identity data may be transmitted to device 117. In some examples, the identity data may be transmitted to server 125. Without limitation, the identity data may comprise at least one selected from the group of a name, an address, an account number, credit card number, social security number, a password, a one-time passcode, and biometric information (e.g., fingerprint, facial recognition, voice recognition, retinal scan).

The second application 115 may be configured to receive one or more notifications based on an identity verification process. As previously explained, the second application 115 may comprise instructions for execution on a second client device 117. Without limitation, the identity verification process may comprise a comparison between the identity data and reference data. In some examples, the reference data may be stored in server 125. In other examples, the reference data may be retrieved from the database 130 by the server 125. For example, the server 125 may transmit one or more requests to database 130 to retrieve data, such as the reference data. The database 130 may be configured to transmit, responsive to the one or more requests from server 125, data, such as the reference data. In some examples, the server 125 may be configured to perform the identity verification process. For example, the server 125 may be configured to compare the identity data with reference data in order to determine an outcome. The server 125 may be configured to compare at least one selected from the group of a name, an address, an account number, credit card number, social security number, a password, a one-time passcode, and biometric information (e.g., fingerprint, facial recognition, voice recognition, retinal scan), and/or any combination thereof with reference data. For example, the server 125 may be configured to compare a password and a one-time passcode with a reference password and a reference one-time passcode.

In some examples, the server 125 may be configured to improve security by requiring one or more additional comparisons to perform one or more iterations of the identity verification process. Continuing with the previous example, the server 125 may be configured to compare, without limitation, an account number of the identity data with a reference account number, after comparing the password and one-time passcode with the reference password and reference one-time passcode. For example, the server 125 may transmit one or more requests to database 130 to retrieve data, such as the reference data, including but not limited to the reference account number. The database 130 may be configured to transmit, responsive to the one or more requests from server 125, data, such as the reference data, including but not limited to the reference account number.

The server 125 may be configured to determine an outcome based on the identity verification process. In some examples, the outcome of the identity verification process may comprise a successful match between the identity data and reference data. In other examples, the outcome of the identity verification process may comprise an unsuccessful match between the identity data and reference data. Without limitation, the unsuccessful outcome may trigger a comparison between least one or more selected from the group of a name, an address, an account number, a credit card number, social security number, a password, a one-time passcode, and biometric information (e.g., fingerprint, facial recognition, voice recognition, retinal scan) with reference data. For example, the original request may comprise a comparison between a password and reference password data, whereas the renewed request, after determination of the unsuccessful outcome, may comprise a password and a one-time passcode and reference password and one-time passcode data. In another example, the original request may comprise a comparison between an account number with reference account number, and the renewed request, after determination of the unsuccessful outcome, may comprise a comparison between biometric information and reference biometric comparison. In some examples, the requested identity data may be same as the renewed request for identity data after determination of the unsuccessful outcome. The server 125 may be configured to transmit the one or more notifications to the second application 115 based on the outcome.

In some examples, the second application 115 may be configured to perform a pre-verification process prior to display of the one or more notifications. For example, the second application 115 may be configured to perform the pre-verification process by requesting, prior to display of the notification, an authentication input of one or more login credentials. The second application 115 may be configured to display the one or more notifications. In some examples, at least one login credential may comprise a password credential. In some examples, at least one login credential may comprise a biometric credential. For example, the biometric credential may include at least one selected from the group of a fingerprint, facial recognition, voice recognition, retinal scan, and/or any combination thereof. In other examples, the one or more login credentials may comprise a password credential, a biometric credential, and/or any combination thereof.

In some examples, at least one notification may comprise an option indicative of requested access to specified information about the first user. For example, the option may comprise a choice to accept or decline access to the specified information about the first user. In some examples, the second application 115 may be configured to modify at least one selected from the group of specified information about the first user and access to the specified information about the first user. In some examples, the notification may further comprise a message that the first client application 110 of the first device 112 is in communication with the contactless card 105 and is requesting access to specified information about the first user. In some examples, the notification may further comprise a menu of shareable specified information about the first user. In some examples, the notification may be configured to enable a response in which the user may select and/or search for additional information to be shared. In this manner, the identity of the first user may be confirmed with only a minimal amount of data revealed, including but not limited to handing a transmitting device or card to a second user, and this may be additionally reduced by the card user maintaining control of their card and gesturing, such as tapping, swiping, waving, and/or any combination thereof, their card themselves on the other user's device. Without limitation, the menu may comprise at least one selected from the group of first name, last name, gender, IP address, email address, mailing address, phone number, transaction information (e.g., merchant, location, goods/services purchased, purchase price, purchase terms and conditions, return and refund policies), transaction history (e.g., transaction information of previous transactions), account information, birthdate, and/or any combination thereof. In some examples, the menu may be customized to include same or different parameters for different users and/or different devices. For example, the menu may be customized to include only email address and phone number for a user associated with a mobile device, whereas the menu may be customized to include only account information and birthday for another user associated with a mobile device. In another example, the menu may be customized to include only transaction information for a user associated with a kiosk. Moreover, the menu may be customized based on previous recognition and/or verification of different users and/or different devices, such that it includes saved settings for each of the customized menu parameters associated with different users and/or different devices.

The first application 110 may be configured to receive the requested access to specified information about the first user based on selection of the option. For example, the first application 110 may be configured to receive access to the specified information about the first user based on selecting the accept access. In some examples, the selection of the option may be associated with a predetermined time duration prior to a timeout of the requested access. In some examples, upon expiration of the timeout of the requested access, the identity verification process may terminate and no longer provide selection of the option. In other examples, upon expiration of the timeout of the requested access, the identity verification process may be re-initiated for a same or different predetermined time duration.

In some examples, access to the specified information about the first user may be associated with one or more permissions that are revocable by the second application 115. For example, at least one permission may comprise a geographic restriction. In this case, the second application 115 may be configured to revoke access to the specified information about the first user based on a geographic limitation such that the access is provided only if the first application 110 is within a predetermined distance of second device 117 within a given location.

In another example, at least one permission may comprise a pre-authorized verification. For example, the second application 115 may be configured to revoke access to the specified information about the first user if the first application 110 has not receive a pre-authorized verification. In some examples, the pre-authorized verification may be a part of an approval list in which the first application 110 has already been authorized to receive the requested access. In some examples, the pre-authorized verification may be based on whether the first application 110 has previously received the requested access, such as within a predetermined time, previous transaction history, and/or any combination thereof.

In another example, at least one permission may comprise at least one selected from personally identifiable information, a transaction type, a merchant type, and/or any combination thereof. For example, the second application 115 may be configured to revoke access to the specified information about the first user if the request includes any portion of personally identifiable information, including but not limited to first name, last name, email, age, gender, birthdate, location, insurance information, and/or any combination thereof unless previously authorized and/or partially redacted.

In another example, the second application 115 may be configured to revoke access to the specified information about the first user if the request does not match with an approved transaction type, such as a transaction for a payment, personally identifiable information, and/or any combination thereof.

In another example, the second application 115 may be configured to revoke access to the specified information about the first user if the request does not match with an approved merchant type, such as a doctor, a pharmacist, a financial institution, a grocery store, a government entity, or the like. For example, the second application 115 may be configured to revoke access to the specified information about the first user if the request does not include a matching identifier associated with a merchant or merchant type, such as a doctor, a pharmacist, a financial institution, a grocery store, a government entity, or the like.

In another example, the second application 115 may be configured to revoke access to the specified information about the first user if the request is performed over a predetermined threshold, such as requesting too frequently within a given time. The second application 115 may also be configured to revoke access to the specified information about the first user if the request is performed at an abnormal or otherwise irregular day, time, and/or any combination thereof. For example, if the request is not performed within normal business hours, or if the request is performed at a day and/or time that does not match with previous request history, the access to the specified information about the first user may be revoked by the second application. Thus, the second application 115 may be configured to determine if the request matches with a previous request by user and/or device in evaluating whether or not to revoke access to the specified information about the first user.

In some examples, the second application 115 may comprise instructions for execution on the second client device 117 different than the first client device 112 of the first application 110 comprising instructions for execution thereon. For example, the second application 115 may comprise instructions for execution on a mobile device whereas the first application 110 may comprise instructions for execution on a kiosk. Moreover, as described herein, it is understood that a user is not confined to being a person. In some examples, the user may comprise or be associated with any device. For example, it may comprise a lockbox to retrieve one or more items, such as a package. In another example, it may comprise a device associated with a pharmacy, store, school, restaurant, hotel, airport, vehicle, market, garage, residential or non-residential building, or the like.

Figure 2A:
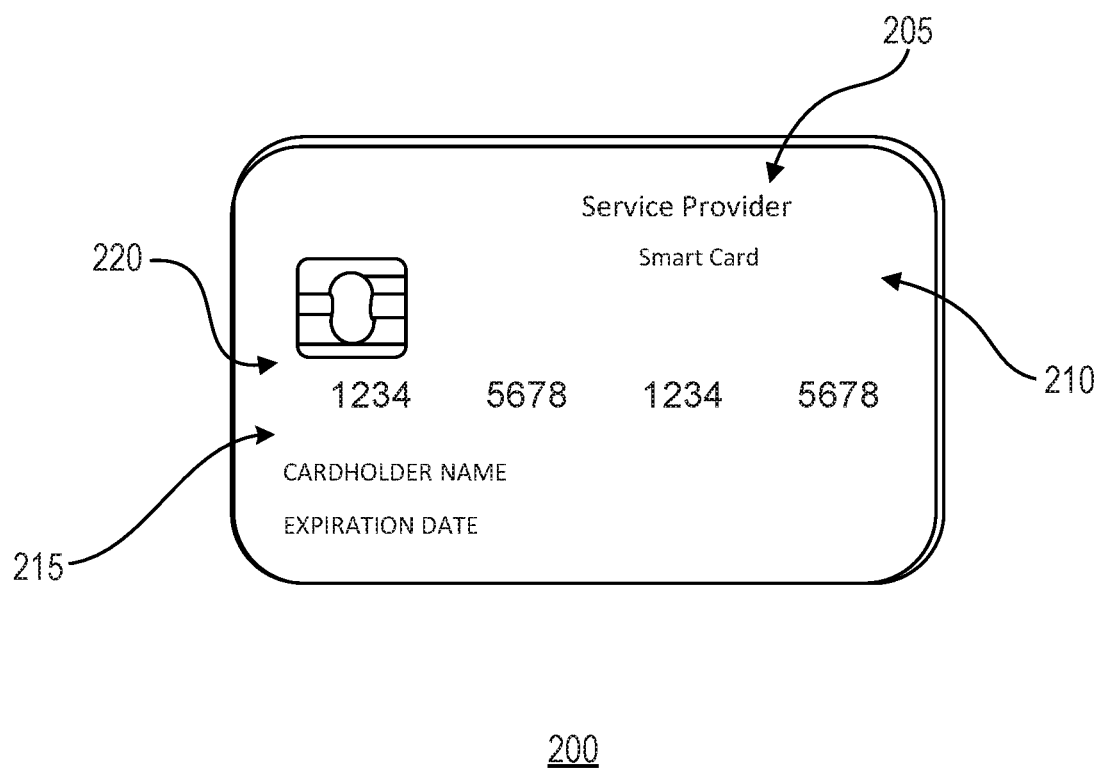
FIG. 2A is an illustration of a contactless card according to an exemplary embodiment.

FIG. 2A illustrates one or more transmitting devices 200. Transmitting device 200 may reference or include same or similar components of transmitting device or contactless card 105, as explained above with respect to FIG. 1. Although FIGS. 2A and 2B illustrate single instances of components of transmitting device 200, any number of components may be utilized.

Transmitting device 200 may be configured to communicate with one or more components of system 100. Transmitting device 200 may comprise a contactless card, which may comprise a payment card, such as a credit card, debit card, or gift card, issued by a service provider 205 displayed on the front or back of the card 200. In some examples, the contactless card 200 is not related to a payment card, and may comprise, without limitation, an identification card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
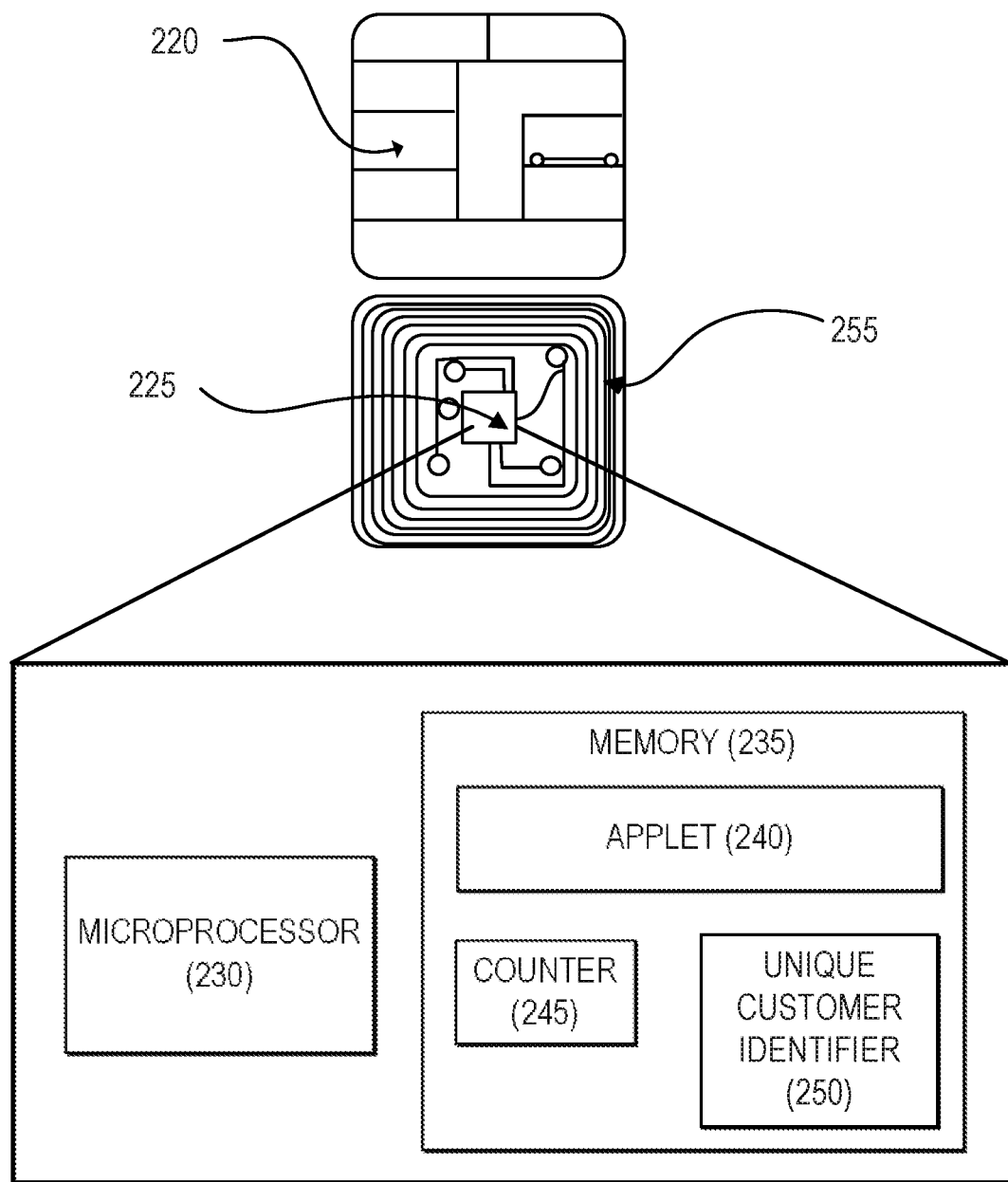
FIG. 2B is an illustration of a contact pad of the contactless card according to an exemplary embodiment.

As illustrated in FIG. 2B, the contact pad 220 of FIG. 2A may include processing circuitry 225 for storing and processing information, including a microprocessor 230 and a memory 235. It is understood that the processing circuitry 225 may contain additional components, including processors, memories, error and parity/CRC checkers, data encoders, anticollision algorithms, controllers, command decoders, security primitives and tamperproofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
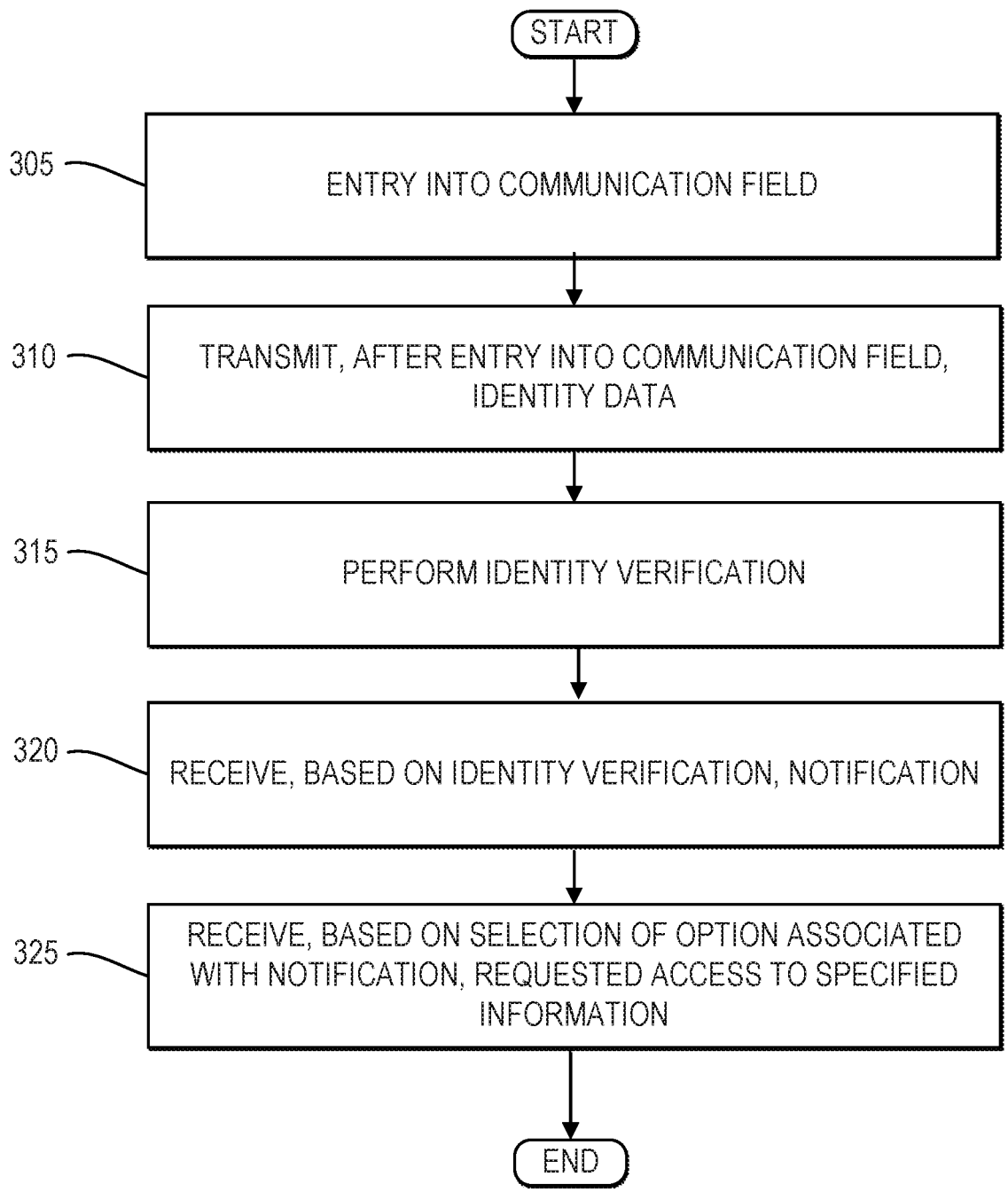
FIG. 3 depicts a method of identity verification according to an exemplary embodiment.

FIG. 3 depicts a method 300 of identity verification according to an exemplary embodiment. FIG. 3 may reference or include same or similar components of system 100 of FIG. 1, and transmitting device 200 of FIG. 2A and FIG. 2B.

At block 305, the method 300 may comprise entering of a card into a communication field of a device. For example, the entry may occur via one or more gestures, including but not limited to a tap, a swipe, a wave, and/or any combination thereof. As previously explained, the first application may comprise instructions for execution on a first client device. In some examples, the entry may be performed by the card user. In other examples, the entry may be performed by the client device user.

At block 310, the method 300 may comprise transmitting, after entry of a contactless card into a communication field, identity data by a first application comprising instructions for execution on a first client device. Without limitation, the identity data may comprise at least one selected from the group of a name, an address, an account number, a credit card number, social security number, a password, a one-time passcode, and biometric information (e.g., fingerprint, facial recognition, voice recognition, retinal scan).

At block 315, the method 300 may include performing an identity verification process of the identity data. Without limitation, the identity verification process may comprise a comparison between the identity data and reference data. In some examples, the reference data may be stored in server. In other examples, the reference data may be retrieved from the database by the server. For example, the server may transmit one or more requests to database to retrieve data, such as the reference data. The database may be configured to transmit, responsive to the one or more requests from server, data, such as the reference data. In some examples, the server may be configured to perform the identity verification process. For example, the server may be configured to compare the identity data with reference data in order to determine an outcome. In other examples, the second application may be configured to perform the identity verification process. For example, the second application may be configured to compare the identity data with reference data stored on the second device in order to determine an outcome.

The server and/or second application may be configured to compare at least one selected from the group of a name, an address, an account number, credit card number, social security number, a password, a one-time passcode, and biometric information (e.g., fingerprint, facial recognition, voice recognition, retinal scan), and/or any combination thereof with reference data. For example, the server may be configured to compare a password and a one-time passcode with a reference password and a reference one-time passcode.

In some examples, the server and/or second application may be configured to improve authentication security by requiring one or more additional comparisons to perform one or more iterations of the identity verification process. Continuing with the previous example, the server may be configured to compare, without limitation, an account number of the identity data with a reference account number, after comparing the password and one-time passcode with the reference password and reference one-time passcode. For example, the server may transmit one or more requests to database to retrieve data, such as the reference data, including but not limited to the reference account number. The database may be configured to transmit, responsive to the one or more requests from server, data, such as the reference data, including but not limited to the reference account number.

In other examples, the second application may be configured to compare the identity data with reference data accessible to the second device, such as by submitting a request or retrieving the reference data from a server. In some examples, the outcome of the identity verification process may comprise a successful match between the identity data and reference data. In some examples, the outcome of the identity verification process may comprise an unsuccessful match between the identity data and reference data. In some examples, if the outcome comprises an unsuccessful match, the identity verification process may end, and the identity verification process may be restarted by the server and/or second application with requesting additional and/or different information from the original request for comparing the identity data with reference data. Without limitation, the unsuccessful outcome may trigger a comparison between least one or more selected from the group of a name, an address, an account number, a credit card number, social security number, a password, a one-time passcode, and biometric information (e.g., fingerprint, facial recognition, voice recognition, retinal scan) with reference data. For example, the original request may comprise a comparison between a password and reference password data, whereas the renewed request, after determination of the unsuccessful outcome, may comprise a password and a one-time passcode and reference password and one-time passcode data. In another example, the original request may comprise a comparison between an account number with reference account number, and the renewed request, after determination of the unsuccessful outcome, may comprise a comparison between biometric information and reference biometric comparison. In some examples, the requested identity data may be same as the renewed request for identity data after determination of the unsuccessful outcome.

The server may be configured to determine an outcome based on the identity verification process. The server may be configured to transmit the one or more notifications to the second application based on the outcome. In other examples, the second application may be configured to determine an outcome based on the identity verification process. In other examples, the second application may be configured to transmit the one or more notifications based on the outcome.

At block 320, the method 300 may comprise receiving, based on an identity verification process of the identity data, a notification at a second application comprising instructions for execution on a second client device, the notification comprising an option indicative of requested access to specified information about a first user, the option further including accept or decline access to the specified information about the first user. For example, the second application may be configured to receive one or more notifications based on an identity verification process.

In some examples, the second application may be configured to perform a pre-verification process prior to display of the one or more notifications. For example, the second application may be configured to perform the pre-verification process by requesting, prior to display of the notification, an authentication input of one or more login credentials. The second application may be configured to display the one or more notifications. In some examples, at least one login credential may comprise a password credential. In some examples, at least one login credential may comprise a biometric credential. For example, the biometric credential may include at least one selected from the group of a fingerprint, facial recognition, voice recognition, retinal scan, and/or any combination thereof. In other examples, the one or more login credentials may comprise a password credential, a biometric credential, and/or any combination thereof.

In some examples, at least one notification may comprise an option indicative of requested access to specified information about the first user. For example, the option may comprise a choice to accept or decline access to the specified information about the first user. In some examples, the second application may be configured to modify at least one selected from the group of specified information about the first user and access to the specified information about the first user. In some examples, the notification may further comprise a message that the first client application of the first device is in communication with the contactless card and is requesting access to specified information about the first user. In some examples, the notification may further comprise a menu of shareable specified information about the first user. For example, the menu may comprise at least one selected from the group of first name, last name, gender, IP address, email address, mailing address, phone number, transaction information, account information, birthdate, and/or any combination thereof. In some examples, the menu may be customized to include same or different parameters for different users and/or different devices. For example, the menu may be customized to include only email address and phone number for a user associated with a mobile device, whereas the menu may be customized to include only account information and birthday for another user associated with a mobile device. In another example, the menu may be customized to include only transaction information for a user associated with a kiosk. Moreover, the menu may be customized based on previous recognition and/or verification of different users and/or different devices, such that it includes saved settings for each of the customized menu parameters associated with different users and/or different devices.

At block 325, the method 300 may comprise receiving, based on selection of the option, the requested access to specified information about the first user. For example, the first application may be configured to receive the requested access to specified information about the first user based on selection of the option associated with the customized menu. For example, the first application may be configured to receive access to the specified information about the first user based on selecting the accept access. In some examples, the selection of the option may be associated with a predetermined time duration prior to a timeout of the requested access. In some examples, upon expiration of the timeout of the requested access, the identity verification process may terminate and no longer provide selection of the option. In other examples, upon expiration of the timeout of the requested access, the identity verification process may be re-initiated for a same or different predetermined time duration.

In some examples, access to the specified information about the first user may be associated with one or more permissions that are revocable by the second application. For example, at least one permission may comprise a geographic restriction. In this case, the second application may be configured to revoke access to the specified information about the first user based on a geographic limitation such that the access is provided only if the first application is within a predetermined distance of the second device within given location.

In another example, at least one permission may comprise a pre-authorized verification. For example, the second application may be configured to revoke access to the specified information about the first user if the first application has not receive a pre-authorized verification. In some examples, the pre-authorized verification may be a part of an approval list in which the first application has already been authorized to receive the requested access. In some examples, the pre-authorized verification may be based on whether the first application has previously received the requested access, such as within a predetermined time, previous transaction history, and/or any combination thereof.

In another example, at least one permission may comprise at least one selected from personally identifiable information, a transaction type, a merchant type, and/or any combination thereof. For example, the second application may be configured to revoke access to the specified information about the first user if the request includes any portion of personally identifiable information, including but not limited to first name, last name, email, age, gender, birthdate, location, insurance information, and/or any combination thereof unless previously authorized and/or partially redacted.

In another example, the second application may be configured to revoke access to the specified information about the first user if the request does not match with an approved transaction type, such as a transaction for a payment, personally identifiable information, and/or any combination thereof.

In another example, the second application may be configured to revoke access to the specified information about the first user if the request does not match with an approved merchant type, such as a doctor, a pharmacist, a financial institution, a grocery store, a government entity, or the like. For example, the second application may be configured to revoke access to the specified information about the first user if the request does not include a matching identifier associated with a merchant or merchant type, such as a doctor, a pharmacist, a financial institution, a grocery store, a government entity, or the like.

In another example, the second application may be configured to revoke access to the specified information about the first user if the request is performed over a predetermined threshold, such as requesting too frequently within a given time. The second application may also be configured to revoke access to the specified information about the first user if the request is performed at an abnormal or otherwise irregular day, time, and/or any combination thereof. For example, if the request is not performed within normal business hours, or the request is performed at a day and/or time that does not match with previous request history, the access to the specified information about the first user may be revoked by the second application. Thus, the second application may be configured to determine if the request matches with a previous request by user and/or device in evaluating whether or not to revoke access to the specified information about the first user.

In some examples, the second application may comprise instructions for execution on the second client device different than the first client device of the first application comprising instructions for execution thereon. For example, the second application may comprise instructions for execution on a mobile device whereas the first application may comprise instructions for execution on a kiosk. Moreover, as described herein, it is understood that a user is not confined to being a person. In some examples, the user may comprise or be associated with any device. For example, it may comprise a lockbox to retrieve one or more items, such as a package. In another example, it may comprise a device associated with a pharmacy, store, school, restaurant, hotel, airport, vehicle, market, garage, residential or non-residential building, or the like.

Figure 4:
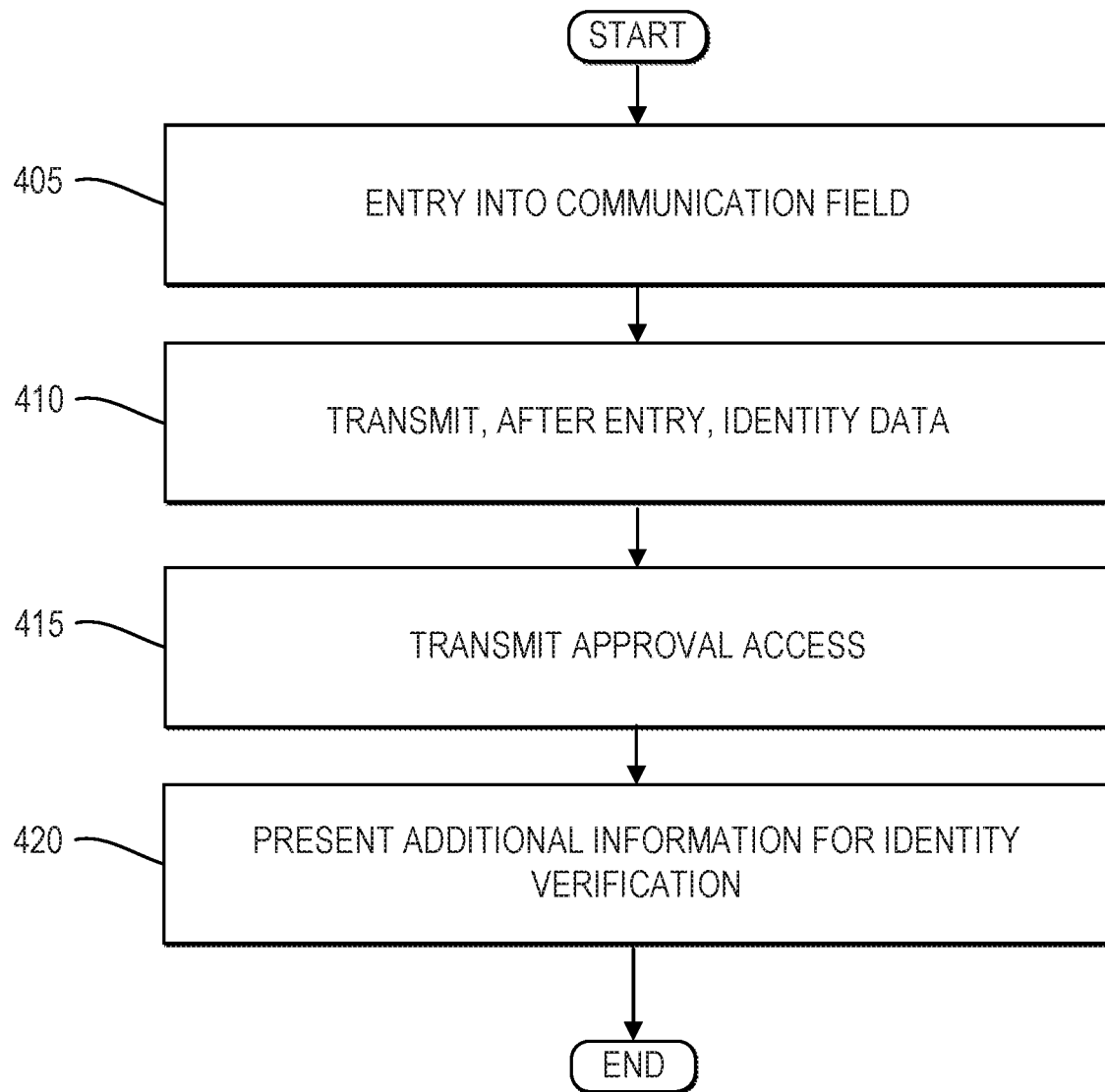
FIG. 4 depicts a method of identity verification according to an exemplary embodiment.

FIG. 4 depicts a method 400 of identity verification according to an exemplary embodiment. FIG. 4 may reference or include same or similar components of system 100 of FIG. 1, transmitting device 200 of FIG. 2A and FIG. 2B, and method 300 of FIG. 3.

At block 405, the method 400 may comprise entry of one or more cards into one or more communication fields of one or more devices. For example, the entry of each card may occur via one or more gestures, including but not limited to a tap, a swipe, a wave, and/or any combination thereof. The communication field may be associated with a single device or a plurality of devices. Each device may comprise an application comprising instructions for execution thereon.

For example, a first user may be associated with a first device and first card. A second user may be associated with a second device and second card. The second card may enter the communication field of first device, such as via one or more gestures. In some examples, the entry may be performed by the card user. In other examples, the entry may be performed by the client device user. The second card may be read by the first application in order to approve access. For example, the user of the device to which the card entered the communication field, such as via a tap, a swipe, a wave, and/or any combination thereof, may be prompted to view the identity of the card user and confirm that is the user intended to verify. For example, the device user may be prompted to accept upon viewing the identity of the card user and thereby confirm the intended user to verify. Alternatively, the device user may be prompted to decline upon viewing the identity of the card user and thereby prohibit confirmation.

At block 410, the method 400 may comprise transmitting, after entry of a contactless card into a communication field, identity data by a first application comprising instructions for execution on a first client device. Without limitation, the identity data may comprise at least one selected from the group of a name, an address, an account number, credit card number, social security number, a password, a one-time passcode, and biometric information (e.g., fingerprint, facial recognition, voice recognition, retinal scan). The method may further comprise performing an identity verification process on the identity data. For example, the identity verification process may comprise a comparison between the identity data and reference data. In some examples, the server may be configured to perform the identity verification process. For example, the server may be configured to compare the identity data with reference data in order to determine an outcome. In other examples, the second application may be configured to perform the identity verification process. For example, the second application may be configured to compare the identity data with reference data stored on the second device in order to determine an outcome. In other examples, the second application may be configured to compare the identity data with reference data accessible to the second device, such as by submitting a request or retrieving the reference data from a server.

In some examples, the server may be configured to determine an outcome based on the identity verification process. In some examples, the outcome may comprise a successful match between the identity data and reference data. In some examples, the outcome may comprise an unsuccessful match between the identity data and reference data. Without limitation, the unsuccessful outcome may trigger a comparison between least one or more selected from the group of a name, an address, an account number, a credit card number, social security number, a password, a one-time passcode, and biometric information (e.g., fingerprint, facial recognition, voice recognition, retinal scan) with reference data. For example, the original request may comprise a comparison between a password and reference password data, whereas the renewed request, after determination of the unsuccessful outcome, may comprise a password and a one-time passcode and reference password and one-time passcode data. In another example, the original request may comprise a comparison between an account number with reference account number, and the renewed request, after determination of the unsuccessful outcome, may comprise a comparison between biometric information and reference biometric comparison. In some examples, the requested identity data may be same as the renewed request for identity data after determination of the unsuccessful outcome. The server may be configured to transmit the one or more notifications to the second application based on the outcome. In other examples, the second application may be configured to determine an outcome based on the identity verification process. In other examples, the second application may be configured to transmit the one or more notifications based on the outcome.

At block 420, the method 400 may comprise transmitting, after the application approves the access by selecting a button, the approval. At block 425, the method 400 may include presenting, in response to the approval, additional data about the second user by the first application. Without limitation, additional data may comprise at least one selected from the group of first name, last name, gender, IP address, email address, mailing address, phone number, transaction information (e.g., merchant, location, goods/services purchased, purchase price, purchase terms and conditions, return and refund policies), transaction history (e.g., transaction information of previous transactions), account information, birthdate, and/or any combination thereof. In this manner, the first application may be configured to prompt the approved access in which confirmation of the second user is requested based on the additionally presented data. Thus, this implementation acts as a second verification of the second user to avoid getting the incorrect card, and in which only minimal information about the second user is revealed.

Figure 5:
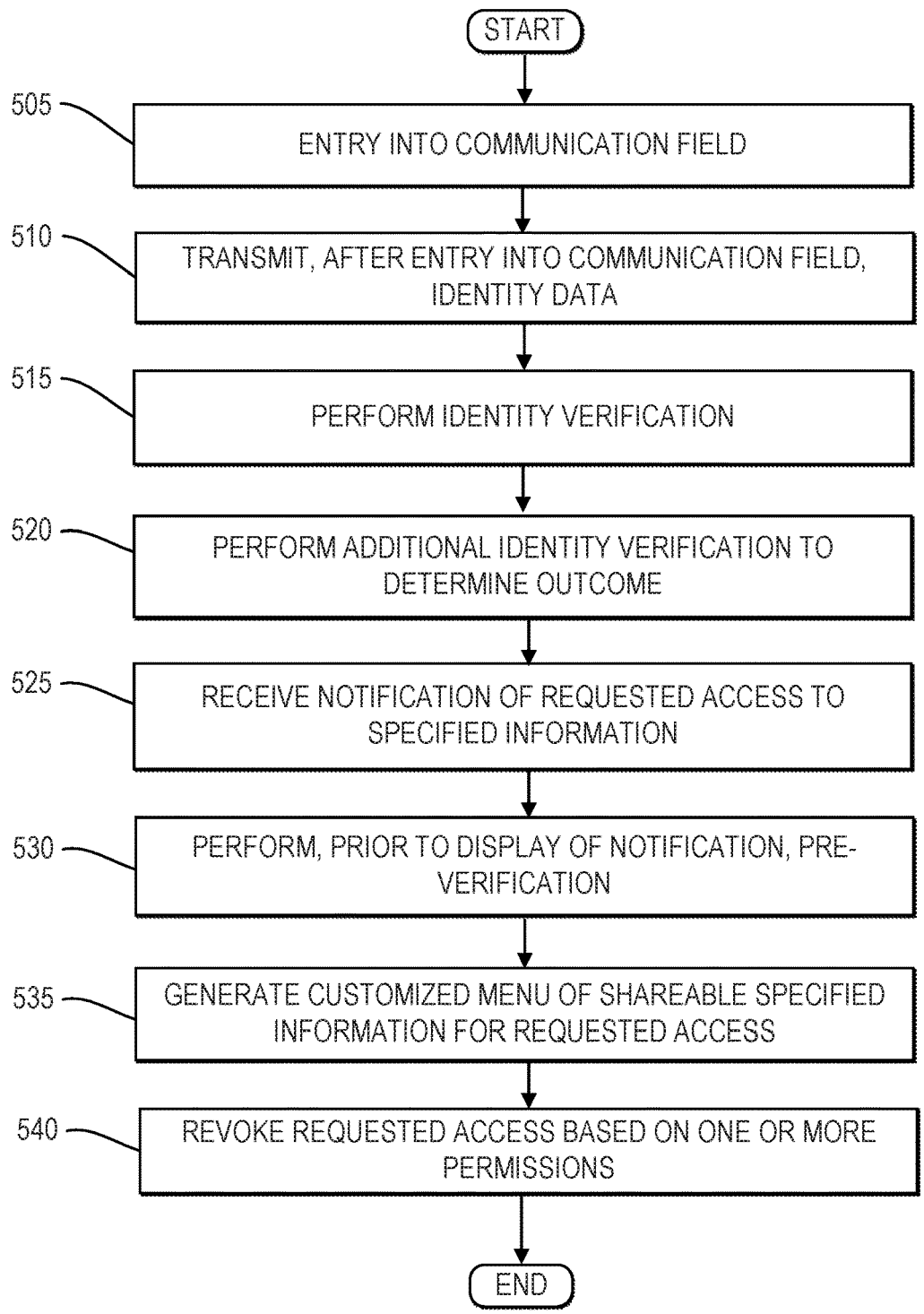
FIG. 5 depicts a method of identity verification according to an exemplary embodiment.

FIG. 5 depicts a method 500 of identity verification according to an exemplary embodiment. FIG. 5 may reference or include same or similar components of system 100 of FIG. 1, transmitting device 200 of FIG. 2A and FIG. 2B, method 300 of FIG. 3, and method 400 of FIG. 4.

At block 505, the method 500 may comprise the entry of a card into a communication field of a device. For example, the entry may occur via one or more gestures, including but not limited to a tap, a swipe, a wave, and/or any combination thereof. As previously explained, the first application may comprise instructions for execution on a first client device. In some examples, the entry may be performed by the card user. In other examples, the entry may be performed by the client device user.

At block 510, the method 500 may comprise transmitting, after entry of a contactless card into a communication field, identity data by a first application comprising instructions for execution on a first client device. Without limitation, the identity data may comprise at least one selected from the group of a name, an address, an account number, a credit card number, social security number, a password, a one-time passcode, and biometric information (e.g., fingerprint, facial recognition, voice recognition, retinal scan).

At block 515, the method 500 may include performing an identity verification process of the identity data. Without limitation, the identity verification process may comprise a comparison between the identity data and reference data. In some examples, the reference data may be stored in server. In other examples, the reference data may be retrieved from the database by the server. For example, the server may transmit one or more requests to database to retrieve data, such as the reference data. The database may be configured to transmit, responsive to the one or more requests from server, data, such as the reference data. In some examples, the server may be configured to perform the identity verification process. For example, the server may be configured to compare the identity data with reference data in order to determine an outcome. In other examples, the second application may be configured to perform the identity verification process. For example, the second application may be configured to compare the identity data with reference data stored on the second device in order to determine an outcome.

The server and/or second application may be configured to compare at least one selected from the group of a name, an address, an account number, credit card number, social security number, a password, a one-time passcode, and biometric information (e.g., fingerprint, facial recognition, voice recognition, retinal scan), and/or any combination thereof with reference data. For example, the server may be configured to compare a password and a one-time passcode with a reference password and a reference one-time passcode.

At block 520, the server and/or application may be configured to improve authentication security by requiring one or more additional comparisons to perform one or more iterations of the identity verification process, such as one or more additional identity verification processes. Continuing with the previous example, the server may be configured to compare, without limitation, an account number of the identity data with a reference account number, after comparing the password and one-time passcode with the reference password and reference one-time passcode. For example, the server may transmit one or more requests to database to retrieve data, such as the reference data, including but not limited to the reference account number. The database may be configured to transmit, responsive to the one or more requests from server, data, such as the reference data, including but not limited to the reference account number.

In other examples, the second application may be configured to compare the identity data with reference data accessible to the second device, such as by submitting a request or retrieving the reference data from a server. In some examples, the outcome of the identity verification process may comprise a successful match between the identity data and reference data. In some examples, the outcome of the identity verification process may comprise an unsuccessful match between the identity data and reference data. In some examples, if the outcome comprises an unsuccessful match, the identity verification process may end, and the identity verification process may be restarted by the server and/or second application with requesting additional and/or different information from the original request for comparing the identity data with reference data. Without limitation, the unsuccessful outcome may trigger a comparison between least one or more selected from the group of a name, an address, an account number, a credit card number, social security number, a password, a one-time passcode, and biometric information (e.g., fingerprint, facial recognition, voice recognition, retinal scan) with reference data. For example, the original request may comprise a comparison between a password and reference password data, whereas the renewed request, after determination of the unsuccessful outcome, may comprise a password and a one-time passcode and reference password and one-time passcode data. In another example, the original request may comprise a comparison between an account number with reference account number, and the renewed request, after determination of the unsuccessful outcome, may comprise a comparison between biometric information and reference biometric comparison. In some examples, the requested identity data may be same as the renewed request for identity data after determination of the unsuccessful outcome.

The server may be configured to determine an outcome based on the identity verification process. The server may be configured to transmit the one or more notifications to the second application based on the outcome. In other examples, the second application may be configured to determine an outcome based on the identity verification process. In other examples, the second application may be configured to transmit the one or more notifications based on the outcome.

At block 525, the method 500 may comprise receiving, based on an identity verification process of the identity data, a notification at a second application comprising instructions for execution on a second client device, the notification comprising an option indicative of requested access to specified information about a first user, the option further including accept or decline access to the specified information about the first user. For example, the second application may be configured to receive one or more notifications based on an identity verification process.

At block 530, the second application may be configured to perform a pre-verification process prior to display of the one or more notifications. For example, the second application may be configured to perform the pre-verification process by requesting, prior to display of the notification, an authentication input of one or more login credentials. The second application may be configured to display the one or more notifications. In some examples, at least one login credential may comprise a password credential. In some examples, at least one login credential may comprise a biometric credential. For example, the biometric credential may include at least one selected from the group of a fingerprint, facial recognition, voice recognition, retinal scan, and/or any combination thereof. In other examples, the one or more login credentials may comprise a password credential, a biometric credential, and/or any combination thereof.

In some examples, at least one notification may comprise an option indicative of requested access to specified information about the first user. For example, the option may comprise a choice to accept or decline access to the specified information about the first user. In some examples, the second application may be configured to modify at least one selected from the group of specified information about the first user and access to the specified information about the first user. In some examples, the notification may further comprise a message that the first client application of the first device is in communication with the contactless card and is requesting access to specified information about the first user.

At block 535, the method 500 may include generating a customized menu of shareable specified information about the first user based on user and/or device. In some examples, the notification may further comprise a menu of shareable specified information about the first user. For example, the menu may comprise at least one selected from the group of first name, last name, gender, IP address, email address, mailing address, phone number, transaction information, account information, birthdate, and/or any combination thereof. In some examples, the menu may be customized to include same or different parameters for different users and/or different devices. For example, the menu may be customized to include only email address and phone number for a user associated with a mobile device, whereas the menu may be customized to include only account information and birthday for another user associated with a mobile device. In another example, the menu may be customized to include only transaction information for a user associated with a kiosk. Moreover, the menu may be customized based on previous recognition and/or verification of different users and/or different devices, such that it includes saved settings for each of the customized menu parameters associated with different users and/or different devices.

At block 540, the method 500 may include revoking access to the specified information about the first user. In some examples, the requested access to specified information about the first user may be received based on selection of the option associated with the customized menu. For example, the first application may be configured to receive the requested access to specified information about the first user based on selection of the option. For example, the first application may be configured to receive access to the specified information about the first user based on selecting the accept access. In some examples, the selection of the option may be associated with a predetermined time duration prior to a timeout of the requested access. In some examples, upon expiration of the timeout of the requested access, the identity verification process may terminate and no longer provide selection of the option. In other examples, upon expiration of the timeout of the requested access, the identity verification process may be re-initiated for a same or different predetermined time duration.

Moreover, access to the specified information about the first user may be associated with one or more permissions that are revocable by the second application. For example, at least one permission may comprise a geographic restriction. In this case, the second application may be configured to revoke access to the specified information about the first user based on a geographic limitation such that the access is provided only if the first application is within a predetermined distance of the second device within given location.

In another example, at least one permission may comprise a pre-authorized verification. For example, the second application may be configured to revoke access to the specified information about the first user if the first application has not receive a pre-authorized verification. In some examples, the pre-authorized verification may be a part of an approval list in which the first application has already been authorized to receive the requested access. In some examples, the pre-authorized verification may be based on whether the first application has previously received the requested access, such as within a predetermined time, previous transaction history, and/or any combination thereof.

In another example, at least one permission may comprise at least one selected from personally identifiable information, a transaction type, a merchant type, and/or any combination thereof. For example, the second application may be configured to revoke access to the specified information about the first user if the request includes any portion of personally identifiable information, including but not limited to first name, last name, email, age, gender, birthdate, location, insurance information, and/or any combination thereof unless previously authorized and/or partially redacted.

In another example, the second application may be configured to revoke access to the specified information about the first user if the request does not match with an approved transaction type, such as a transaction for a payment, personally identifiable information, and/or any combination thereof.

In another example, the second application may be configured to revoke access to the specified information about the first user if the request does not match with an approved merchant type, such as a doctor, a pharmacist, a financial institution, a grocery store, a government entity, or the like. For example, the second application may be configured to revoke access to the specified information about the first user if the request does not include a matching identifier associated with a merchant or merchant type, such as a doctor, a pharmacist, a financial institution, a grocery store, a government entity, or the like.

In another example, the second application may be configured to revoke access to the specified information about the first user if the request is performed over a predetermined threshold, such as requesting too frequently within a given time. The second application may also be configured to revoke access to the specified information about the first user if the request is performed at an abnormal or otherwise irregular day, time, and/or any combination thereof. For example, if the request is not performed within normal business hours, or the request is performed at a day and/or time that does not match with previous request history, the access to the specified information about the first user may be revoked by the second application. Thus, the second application may be configured to determine if the request matches with a previous request by user and/or device in evaluating whether or not to revoke access to the specified information about the first user.

In some examples, the second application may comprise instructions for execution on the second client device different than the first client device of the first application comprising instructions for execution thereon. For example, the second application may comprise instructions for execution on a mobile device whereas the first application may comprise instructions for execution on a kiosk. Moreover, as described herein, it is understood that a user is not confined to being a person. In some examples, the user may comprise or be associated with any device. For example, it may comprise a lockbox to retrieve one or more items, such as a package. In another example, it may comprise a device associated with a pharmacy, store, school, restaurant, hotel, airport, vehicle, market, garage, residential or non-residential building, or the like.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An identity verification system comprising:
a contactless card comprising a processor and memory, the contactless card associated with a first user; and
one or more applications comprising instructions for execution on one or more client devices, wherein:
a first application is configured to transmit, after entry of the contactless card into a communication field, identity data, the first application comprising instructions for execution on a first client device,
a second application is configured to receive a notification based on an identity verification process, the second application comprising instructions for execution on a second client device, the notification comprising:
a menu including shareable specified information about the first user; and
an option indicative of requested access to the shareable specified information about the first user, the option including a choice to accept or decline access to the shareable specified information about the first user, wherein:
the first application is configured to receive the requested access to the shareable specified information about the first user based on selection of the option, and
the second application is configured to revoke the requested access to the shareable specified information about the first user from the menu based on evaluation of redacted specified information from the shareable specified information and one or more permissions, the one or more permissions including at least one selected from the group of a geographic limitation, an approval list, a transaction type, and a frequency threshold.

2. The identity verification system of claim 1, wherein the second application is configured to perform a pre-verification process by requesting, prior to display of the notification, an authentication input of one or more login credentials.

3. The identity verification system of claim 1, wherein the second application is configured to modify at least one selected from the group of the shareable specified information about the first user and access to the shareable specified information about the first user.

4. The identity verification system of claim 1, further comprising a server, wherein the server is configured to:
perform the identity verification process,
determine an outcome based on the identity verification process, and
transmit the notification to the second application based on the outcome.

5. The identity verification system of claim 1, wherein the identity verification process comprises a comparison between the identity data and reference data.

6. The identity verification system of claim 1, wherein the selection of the option is associated with a predetermined time duration prior to a timeout of the requested access.

7. The identity verification system of claim 1, wherein the second application comprises instructions for execution on the second client device different than the first client device.

8. The identity verification system of claim 1, wherein the notification comprises a message that the first client device is in communication with the contactless card and is requesting access to the shareable specified information about the first user.

9. A method of identity verification comprising:
transmitting, after entry of a contactless card into a communication field, identity data by a first application comprising instructions for execution on a first client device;
receiving, based on an identity verification process of the identity data, a notification at a second application comprising instructions for execution on a second client device, the notification comprising:
a menu including shareable specified information about a first user; and
an option indicative of requested access to the shareable specified information about the first user, the option further including accept or decline access to the shareable specified information about the first user;
receiving, based on selection of the option, the requested access to the shareable specified information about the first user; and
revoking, by the second application, the requested access to the shareable specified information about the first user from the menu based on evaluation of redacted specified information from the shareable specified information and one or more permissions, the one or more permissions including at least one selected from the group of a geographic limitation, an approval list, a transaction type, and a frequency threshold.

10. The method of claim 9, further comprising performing a pre-verification process by requesting, prior to display of the notification, authentication input of one or more login credentials.

11. The method of claim 9, further comprising customizing at least one selected from the group of the shareable specified information about the first user and access to the shareable specified information about the first user.

12. The method of claim 9, further comprising:
performing the identity verification process,
determining an outcome based on the identity verification process, and
transmitting the notification to the second application based on the outcome.

13. The method of claim 9, wherein the identity verification process comprises a comparison between the identity data and reference data.

14. The method of claim 12, wherein the identity data includes at least one selected from the group of an account number, a password, a one-time passcode, and biometric information.

15. The method of claim 9, wherein selection of the option is associated with a predetermined time duration prior to a timeout of the requested access.

16. A computer readable non-transitory medium comprising compute-executable instructions that are executed on a processor and comprise the steps of:
transmitting, after entry of a contactless card into a communication field, identity data for identity verification by a first application comprising instructions for execution on a first client device;
performing an identity verification process on the transmitted identity data;
determining an outcome based on the identity verification process;
transmitting the notification to a second application based on the outcome, wherein the second application comprises instructions for execution on a second client device different than the first client device;
customizing at least one selected from the group of shareable specified information about a first user and access to the shareable specified information about the first user;
receiving, based on the identity verification process of the identity data, a notification, the notification comprising:
a menu including the shareable specified information about the first user;
a message that the first application is in communication with the contactless card and is requesting access to the shareable specified information about the first user; and
an option associated with requested access to the shareable specified information about the first user;
receiving, based on selection of the option, the requested access to the shareable specified information about the first user; and
evaluating redacted specified information from the shareable specified information about the first user and one or more permissions are evaluated to determine whether to revoke access to the shareable specified information about the first user, the one or more permissions including at least one selected from the group of a geographic limitation, an approval list, a transaction type, and a frequency threshold.

17. The identity verification system of claim 5, wherein:
the identity data comprises a password and a one-time passcode, and
the reference data comprises a reference password and a reference one-time passcode.

18. The identity verification system of claim 1, wherein:
the one or more permissions comprises the geographic limitation, and
the requested access is revoked if the first application is outside of a predetermined distance of the second device.

19. The method of claim 9, wherein
the one or more permissions comprises the transaction type, and
the requested access is revoked if the requested access does not match an approved transaction type.

20. The method of claim 9, wherein:
the one or more permissions comprises the frequency threshold, and
the requested access is revoked if selection of the option occurs more than a predetermined threshold within a given time.

\* \* \* \* \*